United States Patent [19]
Hernandez

[11] Patent Number: 5,949,977
[45] Date of Patent: Sep. 7, 1999

[54] METHOD AND APPARATUS FOR REQUESTING AND PROCESSING SERVICES FROM A PLURALITY OF NODES CONNECTED VIA COMMON COMMUNICATION LINKS

[75] Inventor: E. Norman Hernandez, Seattle, Wash.

[73] Assignee: Aubeta Technology, LLC, Seattle, Wash.

[21] Appl. No.: 08/725,636

[22] Filed: Oct. 8, 1996

[51] Int. Cl.[6] ................................................ G06F 17/00
[52] U.S. Cl. ............................ 395/200.59; 345/200.33
[58] Field of Search ................... 395/200.33, 200.37, 395/200.56, 200.57, 200.59, 200.71, 673, 674, 675; 370/236

[56] References Cited

U.S. PATENT DOCUMENTS

| | | |
|---|---|---|
| 4,466,063 | 8/1984 | Segarra et al. |
| 4,747,130 | 5/1988 | Ho ............................................ 379/269 |
| 5,548,756 | 8/1996 | Tantry et al. |

OTHER PUBLICATIONS

Burk, R., "Quality of Service," *TCP/IP Blueprints*, Chapter 8, Sams Publishing, Indianapolis, Indiana, 1997, pp. 157–190.
Operating Systems Design and Implementation, Andrew S. Tanenbaum, Prentice Hall, pp. 80–90, 1987.
Priniciples of Programming Languages Design, Evaluation and Implementation, Bruce J. MacLennan, CBS College Publishing, pp. 444–464, 1987.
A Case for NOW (Networks of Workstations), Thomas E. Anderson et al., IEEE Micro, pp. 54–64, 1995.
Dynamic Load Balancing on Amoeba, IEEE ICAP P 95 Conference Paper, IEEE, pp. 355–362, 1959.
Dictionary of Computing, Oxford University Press, p. 186, 1996.
Operating Systems Design and Implementation, Andrew S. Tanenbaum, Prentice Hall, p. 123, 1987.
Computer Networks, Andrew S. Tanenbaum, Prentic-Hall, p. 370, 1996.

*Primary Examiner*—Ellis B. Ramirez
*Attorney, Agent, or Firm*—Christensen O'Connor Johnson & Kindness PLLC

[57] ABSTRACT

A method and apparatus for requesting and processing services from a plurality of workstations (30), remote computers (28) or electronic devices (34), i.e., "nodes," connected via the Internet (20) is provided. The nodes are categorized into classes of resources according to the type of resource or resources that node can provide. When an application run by a node requires a service from a resource, the node broadcasts a request for the service via Internet (20). The service request is received and stored by the nodes comprising the class of resource providing the requested service. The first node capable of processing the service request does so, and then broadcasts a message to the remaining nodes of the class indicating that the service request is in process. Consequently, the remaining nodes of the class defer processing the service request until they receive confirmation that the requested service has been performed. If no such confirmation is received, the next node in the class capable of processing the service request does so, and so on.

17 Claims, 12 Drawing Sheets

REPRESENTATIVE PORTION OF THE INTERNET
(PRIOR ART)

METHOD AND APPARATUS FOR REQUESTING AND PROCESSING SERVICES FROM A PLURALITY OF NODES CONNECTED VIA COMMON COMMUNICATION LINKS

FIELD OF THE INVENTION

This invention generally relates to a network for allowing an electronic device or computer to request services from one or more other electronic devices or computers connected via common communication links and, more specifically, a method and apparatus for allowing an electronic device or computer to request services from devices and computers connected to the Internet.

BACKGROUND OF THE INVENTION

Communication networks are well-known in the computer communications field. By definition, a network is a group of computers and associated devices that are connected by communications facilities or links. Network connections can be of a permanent nature, such as via cables, or can be of a temporary nature, such as connections made through telephone or radio links. Networks may vary in size, from a local area network (LAN) consisting of a few computers or workstations and related devices, to a wide area network (WAN) which interconnects computers and LANs that are geographically dispersed, to a remote access service (RAS) which interconnects remote computers via temporary communication links. An internetwork, in turn, is the joining of multiple computer networks, both similar and dissimilar, by means of gateways or routers that facilitate data transfer and conversion from various networks. A well-known abbreviation for the term internetwork is "internet." As currently understood, the capitalized term "Internet" refers to the collection of networks and routers that use the Transmission Control Protocol/Internet Protocol (TCP/IP) to communicate with one another.

A representative section of the Internet 20 is shown in FIG. 1 (Prior Art) in which a plurality of local area networks (LANs) 24 and a wide area network (WAN) 26 are interconnected by routers 22. The routers 22 are generally special purpose computers used to interface one LAN or WAN to another. Communication links within the LANs may be twisted wire pair, or coaxial cable, while communication links between networks may utilize 56 Kbps analog telephone lines, 1 Mbps digital T-1 lines and/or 45 Mbps T-3 lines. Further, computers and other related electronic devices can be remotely connected to either the LANs 24 or WAN 26 via a modem and temporary telephone link. Such remote computers 28 and electronic devices 34 are shown in FIG. 1 as connected to one of the LANs 24 via a dotted line. It will be appreciated that the Internet comprises a vast number of such interconnected networks, computers and routers and that only a small, representative section of the Internet 20 is shown in FIG. 1.

With the advent of new and improved network technologies, virtually any device equipped with the necessary hardware can be permanently or temporarily connected to a LAN, WAN, etc., and thus, to the Internet via common communications links between disparate networks. These devices can include various types of computers, such as servers, workstations, personal device assistants, etc., or electronic devices such as facsimile machines, telephones, printers, etc. Each computer and/or electronic device that is connected to the Internet 20 and that is capable of communicating with other electronic devices or computers connected to the Internet can be referred to as a node. In addition, each node connected to the Internet 20 has the common ability to provide any other node connected to the Internet with certain services. Therefore, any node capable of providing a service is referred to as a "resource" for that service. For example, a facsimile machine connected to the Internet is a facsimile resource for providing facsimile reception and transmission services, while a server may be a database resource for providing information storage and retrieval services. Further, a node may provide multiple resources, e.g., a server could provide a database resource, a facsimile resource, a voice massaging resource, etc.

In a typical network environment, a client/server architecture is employed to distribute resources between nodes connected to a network, e.g., LAN 24, WAN 26 or, ultimately, the Internet 20. The client is normally a stand-alone computer or workstation that runs specific software applications for its user, such as word processing programs, web browsers, spreadsheets, etc., and accesses shared network resources provided by a server. The server runs administration software that controls the network resources. Under the traditional client/server architecture, if an application running on the client requires a service that the client cannot provide, such as information retrieval from a particular database, the client must request the service from a server that controls the resource for that service, i.e., the server storing the database. However, the client must have specific knowledge of the server and its location so that it may request the service. Further, if the client wants additional services from other resources controlled by different servers, the client and respective servers must conduct sophisticated and separate data exchange sessions in order to integrate various services and resources.

Accordingly, a more effective method and apparatus for requesting services from resources provided by nodes connected to a network, and ultimately, the Internet, is needed. The method and apparatus should allow service requests to be communicated and processed in a manner totally transparent to the applications requesting them. In other words, the node requesting the service from a particular resource should neither have direct knowledge nor require direct connection to the node being accessed for the resource. Further, the method and apparatus should not be restricted to any internal network topologies and should be able to simultaneously access resources from different nodes regardless of the type of hardware or software implemented by that node.

SUMMARY OF THE INVENTION

In accordance with the present invention, a method and apparatus for requesting and processing services from a plurality of nodes connected via common communication links, such as a local area network on a small scale, or the Internet on a large scale, is provided. The nodes connected to the common communication links are classified into classes of resources according to the type of resource or resources that node can provide. When an application run by a node requires a service from a resource, the node broadcasts a request for the service via the common communication links. The nodes comprising the class of resource providing such services receive and process the request. Each node in the class processes the services requests it receives in a predefined order, e.g., a first-in-first-out order, and the first node of the class capable of processing a particular service request does so. In addition, the first node broadcasts a message to the remaining nodes of the class indicating that the particular service request is in process.

Consequently, the remaining nodes of the class defer processing the particular service request until they receive confirmation that the service has been performed. However, if the remaining nodes of the class never receive such confirmation, another node in the class will eventually process the particular service request.

In accordance with other aspects of the present invention, each class of resource is associated with an object in an object-oriented programming paradigm that the object contains methods and data defining the behavior of the class of resource associated with the object.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
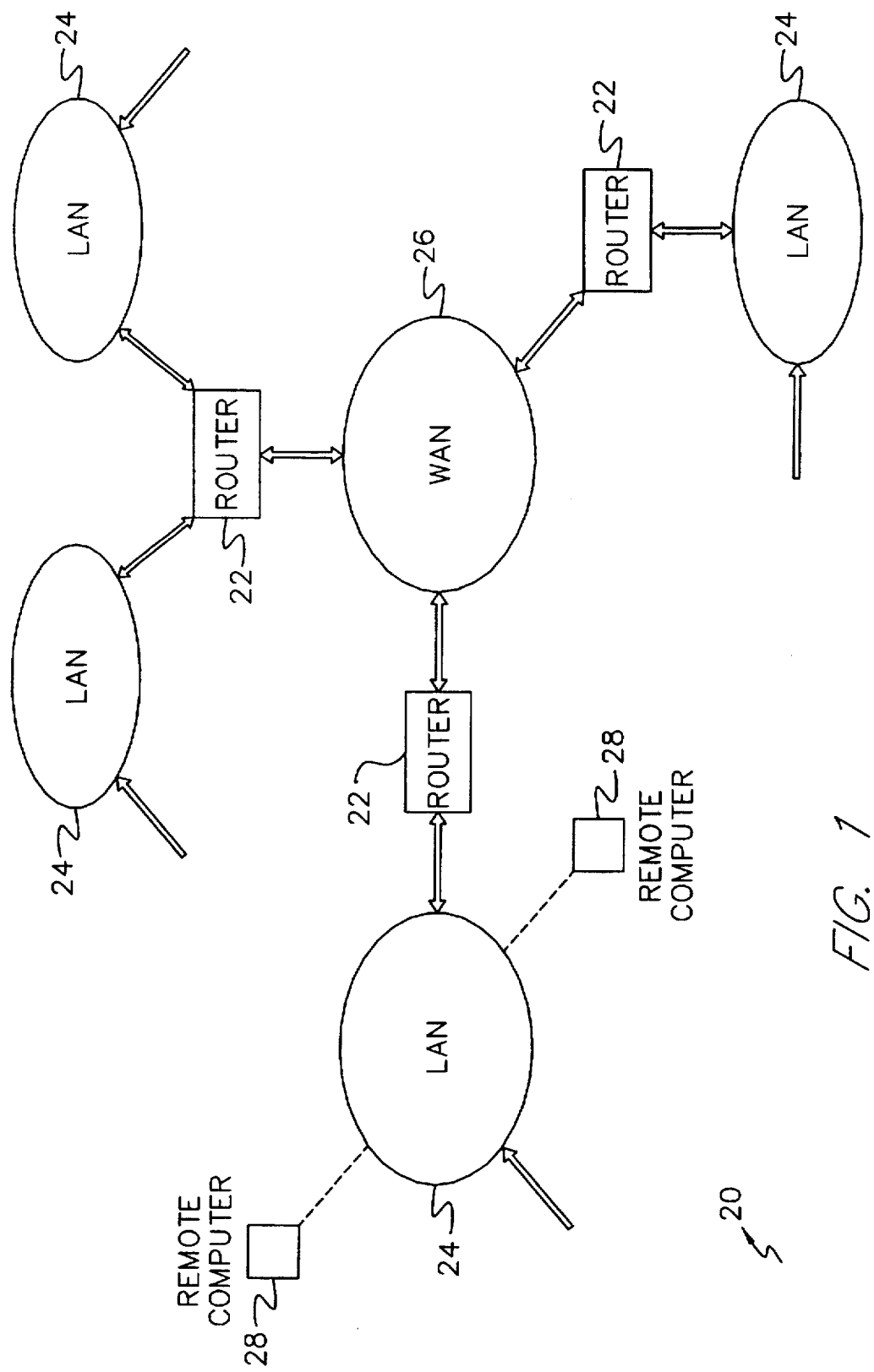
FIG. 1 (Prior Art) is a block diagram of a representative portion of the Internet.
Figure 2:
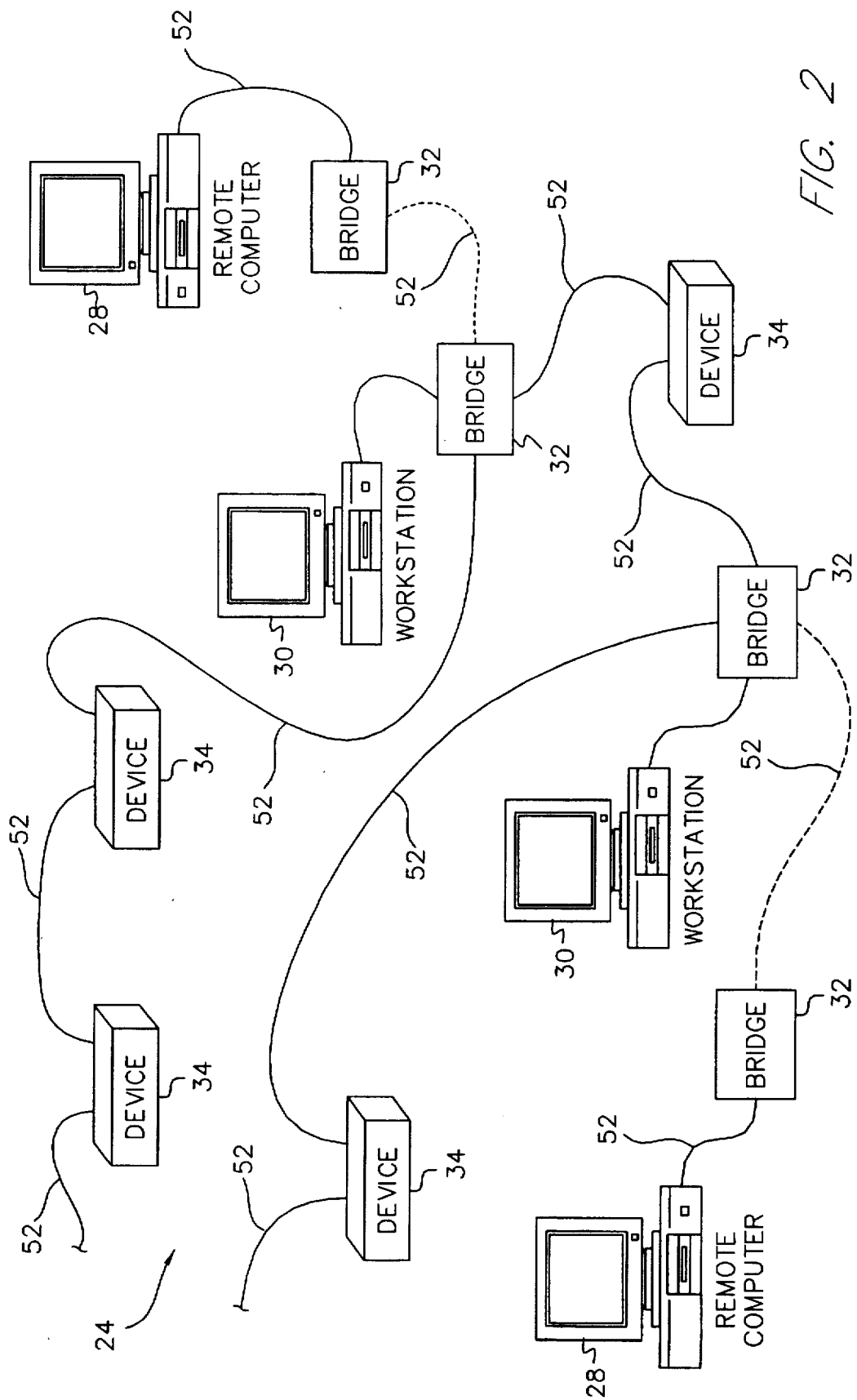
FIG. 2 is a pictorial diagram of a plurality of workstations, remote computers and electronic devices, i.e., "nodes," interconnected to form a local area network such as that typically connected to the Internet as shown in FIG. 1.

As previously described and shown in FIG. 1, the Internet 20 is a collection of local area networks (LANs) 24, wide area networks (WANs) 26 and routers 22 that use the Transmission Control Protocol/Internet Protocol (TCP/IP) to communicate with each other. FIG. 2 illustrates in more detail a LAN 24 such as that typically connected to the Internet 20. In the embodiment of the present invention depicted in FIG. 2, the LAN 24 is a bus network interconnecting various workstations 30, electronic devices 34 and remote computers 28. As will be appreciated by those familiar with network computer systems from the following description, any number of electronic devices and computer systems could be connected to the LAN 24, and thus, the Internet 20, if equipped with the necessary hardware. Suitable electronic devices may include telephones, facsimile machines, printers, digital signal processors, etc. In addition, any computer system, including but not limited to workstations, personal computers, servers, remote computers, etc., that is equipped with the necessary interface hardware, e.g., bridge 32, may be connected temporarily or permanently to the LAN 24, and thus, the Internet 20. However, if temporarily connected via a telephone link to another device connected to the LAN 24, the interface hardware of both the remote computer 28 and the device to which it is connected must contain a modem.

As mentioned above, each workstation 30, remote computer 28 and electronic device 34 that is connected to the LAN 24, and thus, the Internet 20, that is capable of communicating with other electronic devices or computers connected to the Internet can be referred to as a node. In addition, each node connected to the Internet 20 capable of providing a service to another node is referred to as a resource for that service. For example, a node may be a facsimile resource, database resource, voice messaging resource, document transfer resource, PBX resource, computer telephone integration resource, printer resource, and so on. In addition, any one node may provide multiple resources. However, those of ordinary skill in the art will appreciate that this list of resources is for illustrative purposes only and is not intended to be exhaustive.

The present invention provides a method and apparatus that enables each node connected to the Internet 20 to be organized into a class of resource according to the type of resource or resources that node can provide. Therefore, when an application run by a node requires a service from a resource, e.g., transmission of a facsimile, retrieval of a document from a database, etc., the node merely broadcasts a request for the service via the Internet 20 to the nodes comprising the class of resource providing such services. The first node of the class capable of processing the service request then does so. However, if the first node fails to perform the requested service, the next node of the class capable of processing the service request then does so, and so on.

Inter-Device Communication

Figure 3:
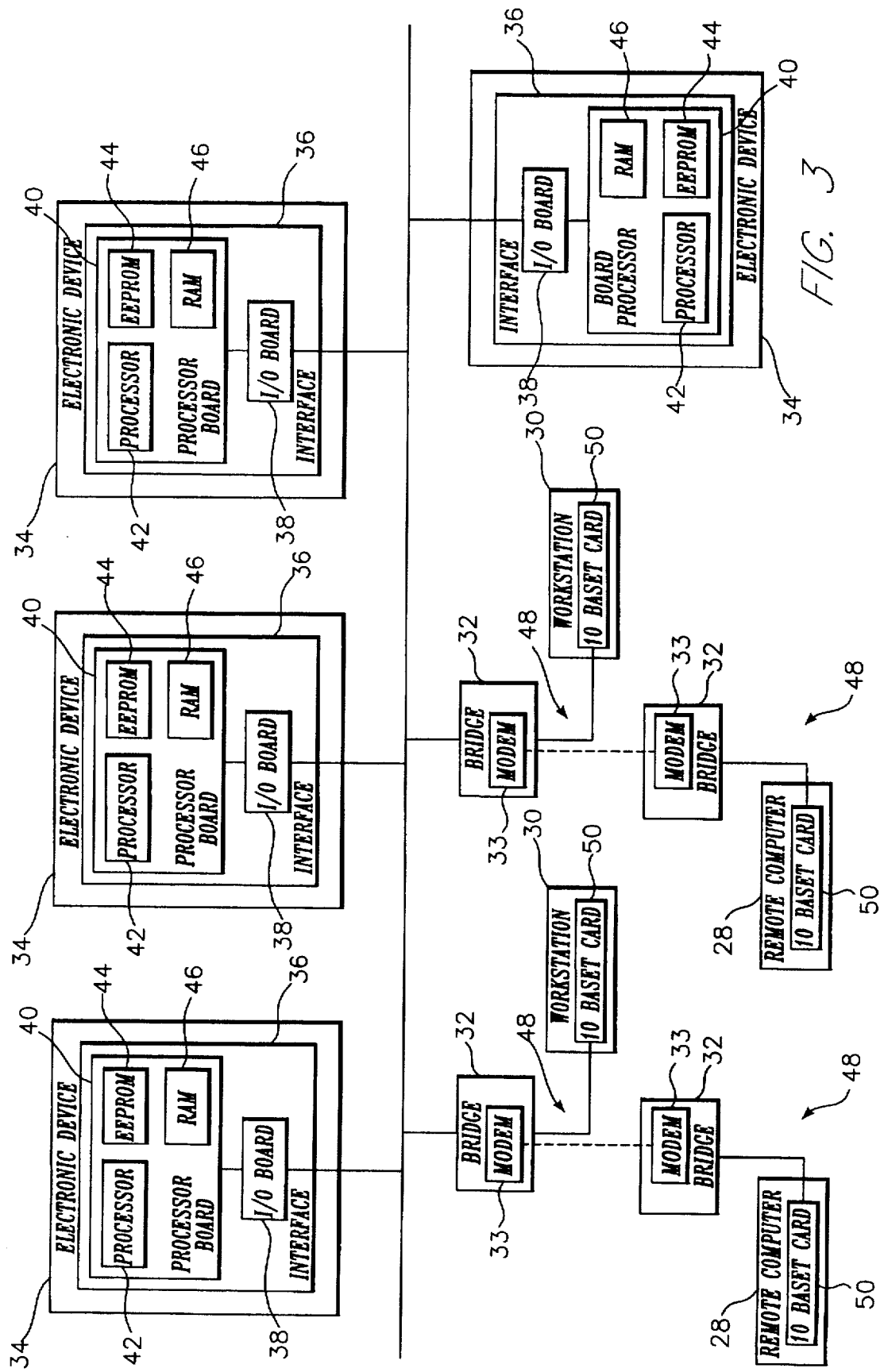
FIG. 3 is a block diagram of the local area network and the interconnected remote computers, electronic devices and workstations shown in FIG. 2.

FIG. 3 illustrates one of the LANs 24 in FIG. 2 interconnecting the same electronic devices 34, workstations 30 and remote computers 28. The LAN 24 shown in FIG. 3 is of a bus network configuration and can be formed of various coupling media such as glass or plastic fiberoptic cables, coaxial cables, twisted wire pair cables, ribbon cables, etc. In addition, one of ordinary skill in the art will appreciate that the coupling medium can also include a radio frequency coupling media or other coupling media. In view of the availability of preinstalled wiring in current commercial environments, twisted wire pair copper cables are used to form the LAN 24 in the preferred embodiment of the present invention.

Each device 34 includes an interface 36 comprising an input/output (I/O) board 38 and a processor board 40 which allow the devices 34 to be directly connected to the LAN 24. The I/O board 38 is specifically constructed for use with the TCP/IP protocol, the bus network configuration of LAN 24 and a particular type of coupling medium, whereas the processor board 40 can be used with different communication configurations and coupling media.

The processor board 40 of the interface 36 controls the communication of the electronic device 34 over the LAN 24. The processor board 40 includes a processor 42, an electrically erasable programmable read-only memory (EEPROM) 44 and a random access memory (RAM) 46. The EEPROM 44 is used by the processor 42 to temporarily store program code and data, including the program code and data necessary for requesting and processing services in accordance with the present invention. The RAM 46, on the other hand, stores a queue of service requests (not shown) made by other nodes connected to the Internet 20. As will be described in more detail below, the processor 42 of the electronic device 34 processes these service requests in a first-in-first-out order, and deletes each service request from the stored queue once the requested service is performed. It will appreciated by those of ordinary skill in the art that the queue may comprise any data storage structure deemed appropriate by the programmer, i.e., a linked list, an array, a database, etc. The RAM 46 also stores a database of objects (not shown) organized in a class hierarchy that define each of the resources the electronic device is capable of providing. One of ordinary skill in the art will recognize that the electronic device 34 includes many more components than those shown in FIG. 3. Such components are not described because they are conventional, and a description of them is not necessary to an understanding of the present invention.

When an electronic device 34 sends data, a command such as a service request, or program code (collectively referred to herein as data), the processor board 40 of the interface 36 housed in the device constructs a TCP/IP packet of data representing the relevant information. The processor board 40 determines the time in which the LAN 24 is available for sending the packet in accordance with the TCP/IP protocol. The processor board 40 sends the packet to the I/O board 38 at the appropriate time, and upon receipt of the packet, the I/O board transmits the packet via the LAN 24 to the other devices and workstations. When a device 34 receives data from another workstation 30 or device 34, the I/O board 38 receives the packet over the LAN 24, and sends the packet to the processor board 40. Upon receipt of the packet, the processor board 40 of the interface 36 processes the packet and performs any appropriate function, such as processing the service requested by the packet or sending back a response packet.

Also shown in FIG. 3, each of the workstations 30 and remote computers 28 is connected to the LAN 24 by way of a 10BaseT interface 48 and a bridge 32. However, each remote computer 28 is connected to a workstation 30 via a temporary telephone link and communicates with the workstation 30 using a modem 33 found in the bridge 32 of both the workstation 30 and the remote computer 28. The workstations and remote computers include a 10BaseT card 50 and a 10BaseT cable 52 for communicating with other network devices. 10BaseT is an interface standard which specifies signal voltage levels, etc. 10BaseT is also a byte-level communication level protocol that specifies start bits, stop bits, etc., for sending bytes of data. Generally, a higher level communication protocol is used on top of the 10BaseT byte-level protocol to communicate via the Internet 20, e.g., the TCP/IP protocol. The bridge 32 provides the interface between the 10BaseT cables 50 and the LAN 24, on which the TCP/IP communication protocol is used.

Relevant Workstation and Remote Computer Components

Figure 4:
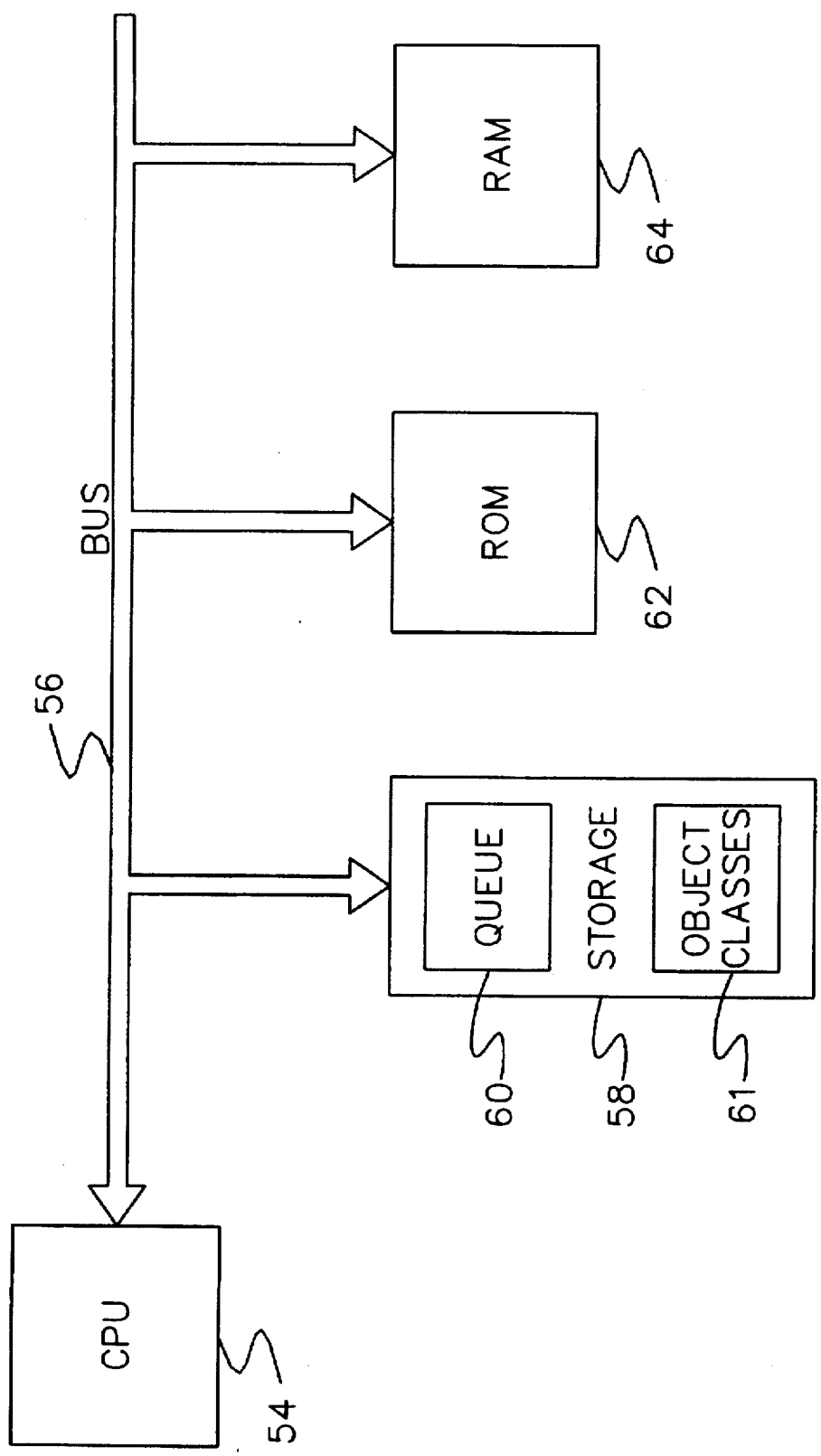
FIG. 4 is a block diagram of the several components of a workstation shown in FIG. 3 that are used to request and process services from resources in accordance with the present invention.

The components of each workstation 30 included in FIGS. 2 and 3 is shown in more detail in FIG. 4. The workstation includes a central processing unit (CPU) 54 coupled by a bus 56 to a read-only memory (ROM) 62 and a random access memory (RAM) 64. The CPU responds to program instructions stored in the ROM 62 and temporarily in the RAM 64. The workstation 30 also includes a permanent storage device 58, such as a hard disk drive, floppy disk drive, tape drive, optical drive, or combination thereof, that is connected to the CPU by the bus 56. The permanent storage device 58 stores the program code and data necessary for requesting and processing services in accordance with the present invention. The RAM 64 stores a queue 60 of service requests made by other nodes connected to the Internet 20. It will appreciated by those of ordinary skill in the art that the queue may comprise any data storage structure deemed appropriate by the programmer, i.e., a linked list, an array, a database, etc. As will be described in more detail below, the CPU 54 of the workstation 30 processes these service requests in a first-in-first-out order, and deletes each service request from the stored queue once the requested service is performed. The RAM 64 also stores a database of objects 61 organized in a class hierarchy that define each of the resources the workstation is capable of providing. It will be appreciated to those of ordinary skill in the art that remote computer 28 includes essentially the same components as the workstation 30, and thus, will not be described separately. Further, both the remote computer 28 and the workstation 30 include many more components than those shown in FIG. 4. Such components are not described because they are conventional, and a description of them is not necessary to an understanding of the present invention.

Organization of Nodes into Classes of Resources

As mentioned above, each workstation 30, electronic device 34 or remote computer 28, i.e., node, connected to the Internet 20, is organized into classes of resources according to the type of resource or resources that node can provide. In one actual embodiment of the present invention, an object-oriented programming paradigm is used to represent the classes of resources into which the nodes are classified.

Using an object-oriented programming paradigm, each resource provided by a node is associated with an object, i.e., a variable comprising data and methods that define the behavior of that resource. Methods are procedures or code that operate upon and isolate the data, making the object interoperable with other objects regardless of the data contained by those objects. The objects in an object-oriented programming paradigm are organized into classes in a hierarchical fashion. A class defines a certain category or grouping of methods and data for each object in the class. In addition, each class of objects may be divided into further subclasses of objects, each subclass may be divided into further "sub-subclasses," and so on. The objects of each subclass inherit the methods and data of its parent class (or subclass), plus they each include additional methods and data that are unique to its subclass. The organization of data and the methods into classes of objects is essential in object-oriented systems. It permits large-scale maintenance efforts, since the methods and data of a subclass of objects are inherited from their parent class and a change in the methods of a class will automatically effect changes in the methods of all the objects of that class and its subclasses.

Figure 5:
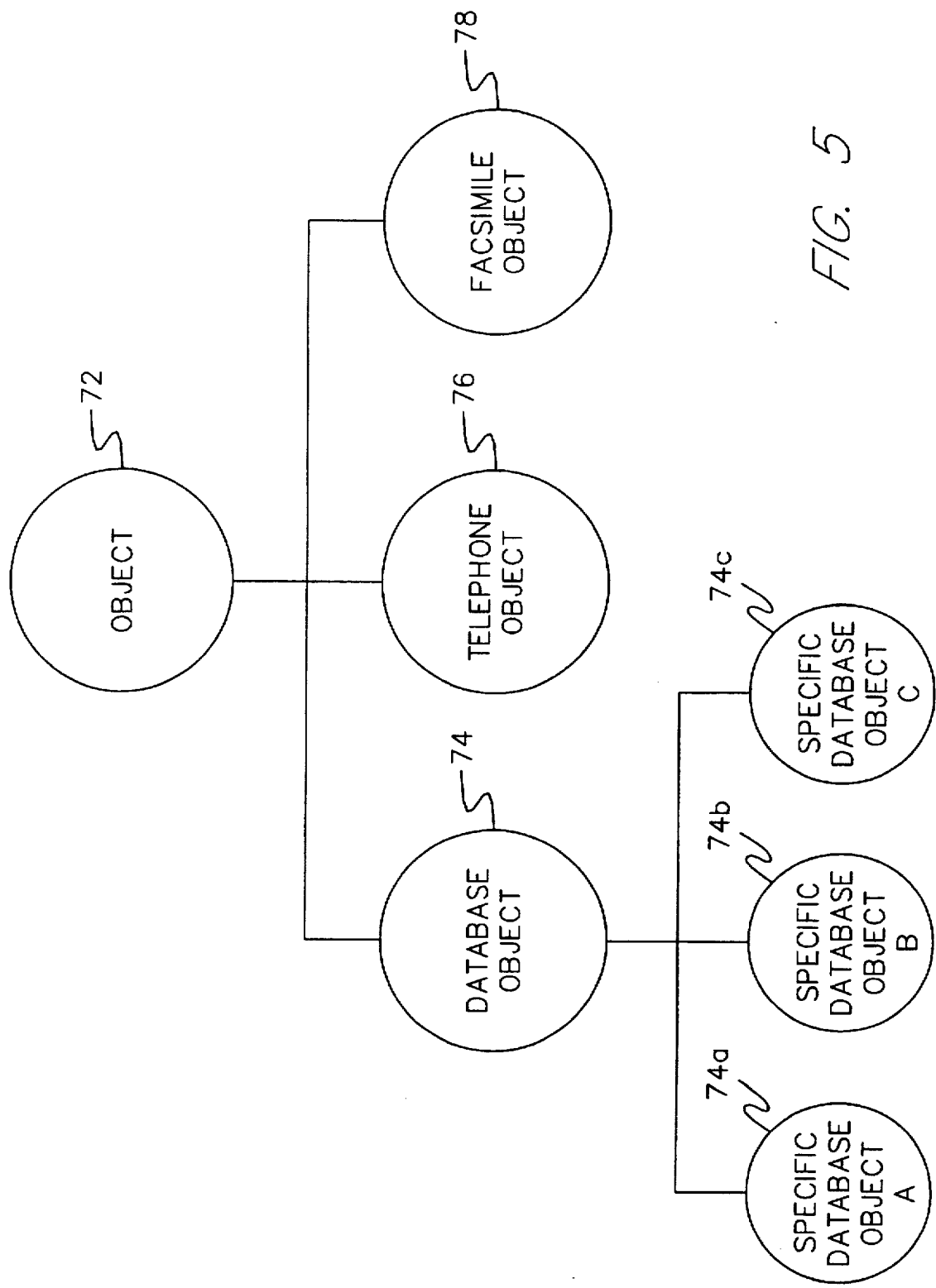
FIG. 5 is a hierarchical diagram of an object-oriented programming diagram used to organize the resources provided by the remote computers, workstations and devices shown in FIG. 2 into classes in connection with the present invention.

FIG. 5 shows a class hierarchy perspective employed in one actual embodiment of the present invention and stored in memory of an exemplary node connected to Internet 20 capable of providing database, telephone and facsimile resources. A database object 74, a telephone object 76 and a facsimile machine object 78 are each shown as a subclass beneath the generic class object 72. Thus, the database object 74, telephone object 76 and facsimile object 78 each inherit the generic data and methods of generic object 72.

plus they each include additional data and methods that are unique to its subclass. Specifically, the database object 74 contains the data and methods necessary for requesting and retrieving information from a database; telephone object 76 contains the data and methods necessary for transmitting and receiving telephonic communications; and facsimile machine object 78 contains the data and methods necessary for transmitting and receiving facsimiles. As mentioned above, the class comprising the database, telephone and facsimile objects may be subdivided into further subclasses. For example, the database object 74 may be divided into a subclass of specific database objects 74a, 74b and 74c. For example, specific database objects 74a, 74b and 74c may contain the data and methods that define an "ORACLE" database, a "SQL" database, and an "ACCEL" database, respectively (however, it is unlikely that any node would be a resource for all three of these types of databases and thus, store a specific database object for each type).

Those of ordinary skill in the art will recognize that the objects stored in memory of any other node connected to the Internet 20 may or may not include those depicted in FIG. 5. The objects shown in FIG. 5 are merely an illustrative sample of those that may be employed by one particular node to classify the resources provided by that node, and is not intended to be exhaustive. It is more important that each resource provided by a node connected to the Internet 20 be associated with at least one object in the node's memory. Those of ordinary skill in the object-oriented programming arts will recognize that a node can provide new resources or discontinue old resources by merely adding or removing the appropriate objects defining that resource from its memory. Hence, upon connection to the Internet 20, any new node can be added to any class of resource by adding the appropriate objects defining the resource or resources provided by the new node to the memory of the new node. It will be appreciated that this feature provides instant scaleability to the entire system, i.e., a class of resource, can instantly and automatically shrink or expand by merely programming the appropriate object in memory of a node connected to the Internet 20. Such an addition is completely transparent to any other node in the class, or any other node connected to the Internet 20 for that matter.

Requesting Services from a Resource Provided by a Node

Figure 6:
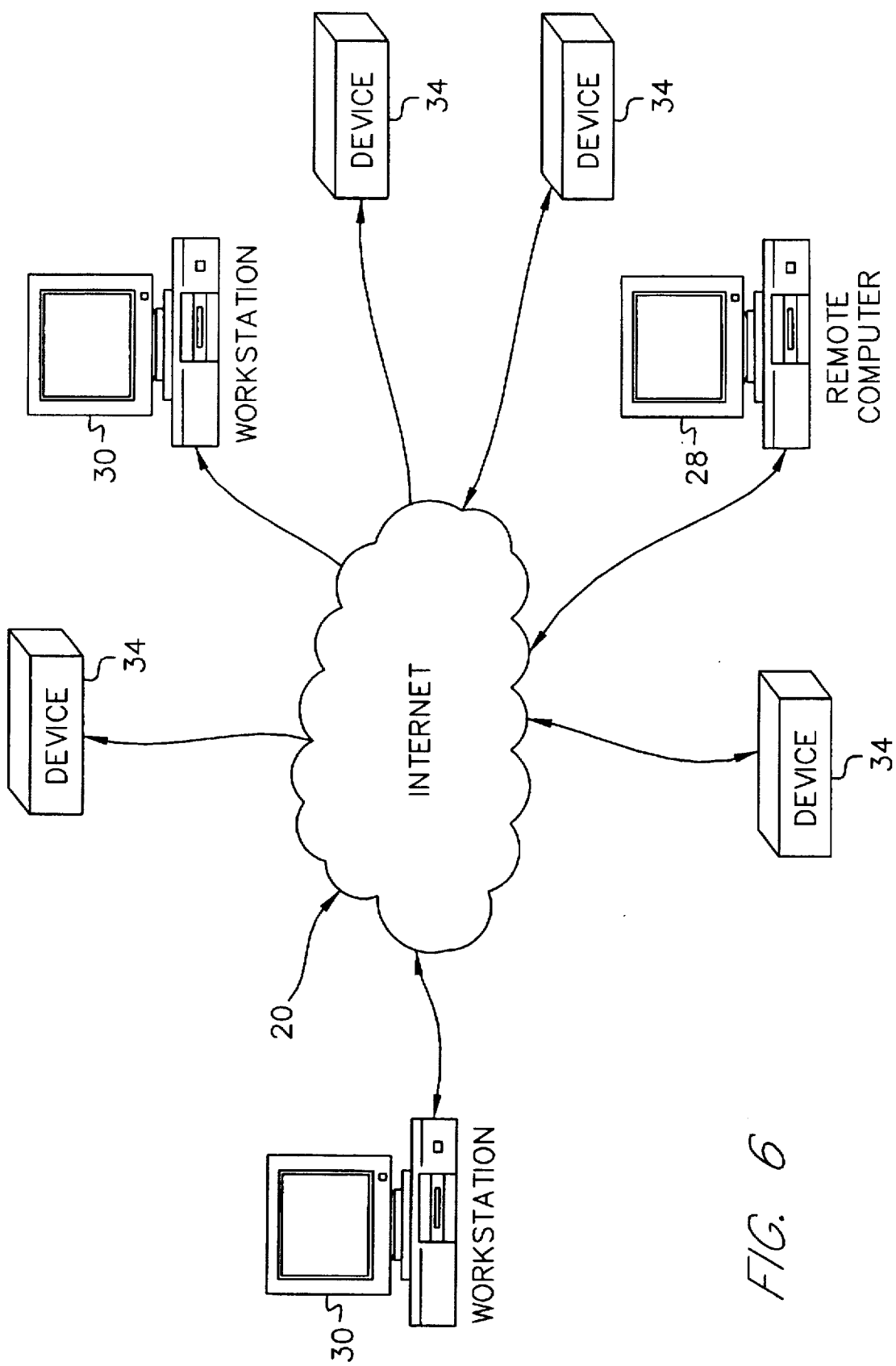
FIG. 6 is a pictorial diagram of a workstation requesting a service via the Internet from a plurality of other workstations, devices and remote computers comprising a class of resources.

FIG. 6 depicts a node, in this case a workstation 30, requesting a service from a number of nodes comprising a class of resource, via the Internet 20. In accordance with the present invention, when a service is required by a particular application being run by the node, the node prepares a message requesting the service and broadcasts the service request in the form of a packet via the Internet 20. The packet broadcast by the requesting node identifies the class of resource from which the service is being requested. Only those nodes connected to the Internet 20 that have stored in memory an object in the identified class, process the broadcasted packet and enclosed service request. Hence, it is unnecessary for the requesting node to know which nodes provide the necessary resource or the exact location of those nodes. Further, the direct temporary or permanent connections of the node to the Internet 20 or the other hardware and software implemented by the node are completely immaterial. For example, if retrieval of information from a database is required, the node will broadcast a service request via the Internet 20 that will be processed by each node associated with database object 74. By definition of a class, each of the nodes associated with the subclasses of database object 74, i.e., specific database objects 74a, 74b or 74c, will receive and process the service request as well. However, if retrieval of information from a specific kind of database, such as an "ORACLE" database, is required, the node will broadcast a service request via the Internet that will be processed only by those nodes storing the corresponding specific database object, such as specific database object 74a. As will be described in more detail below, the first node in the class that has the opportunity to process the service request, does so. The remaining nodes defer processing until the first node broadcasts a message confirming performance of the requested service.

Figure 7:
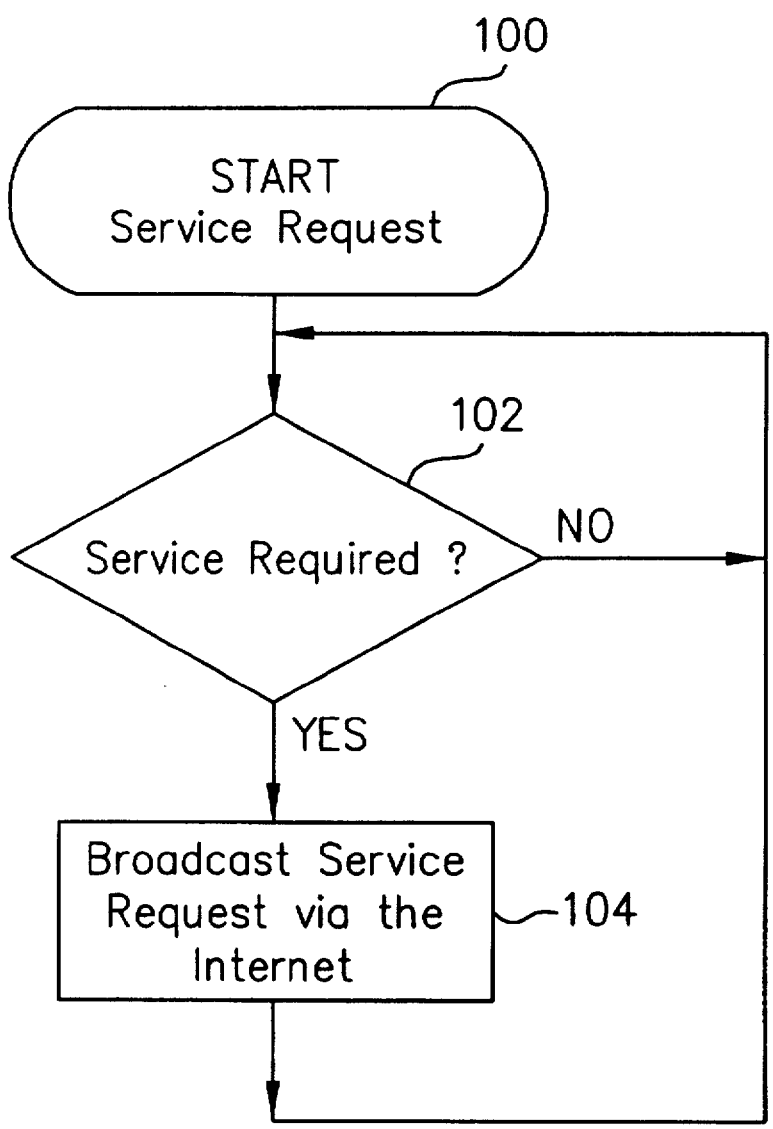
FIG. 7 is a flow chart illustrating the logic used by a node to request a service from the nodes comprising a class of resource capable of providing the requested service.

FIG. 7 illustrates the logic implemented by a node to request a service from the nodes comprising the appropriate class of resource via the Internet 20. The logic begins in a block 100 and proceeds to a decision block 102 where it determines if a service is required. As mentioned above, services may be required by the applications currently running on the node. If a service is not required, the logic merely repeats decision block 102 until an application does require a service. In a block 104, the node requests the service by broadcasting a packet via the Internet 20 that identifies the class of resource capable of providing the requested service. The logic then returns to decision block 102 and the node prepares to send another service request. Blocks 102 and 104 are then repeated for each required service.

Figure 8:
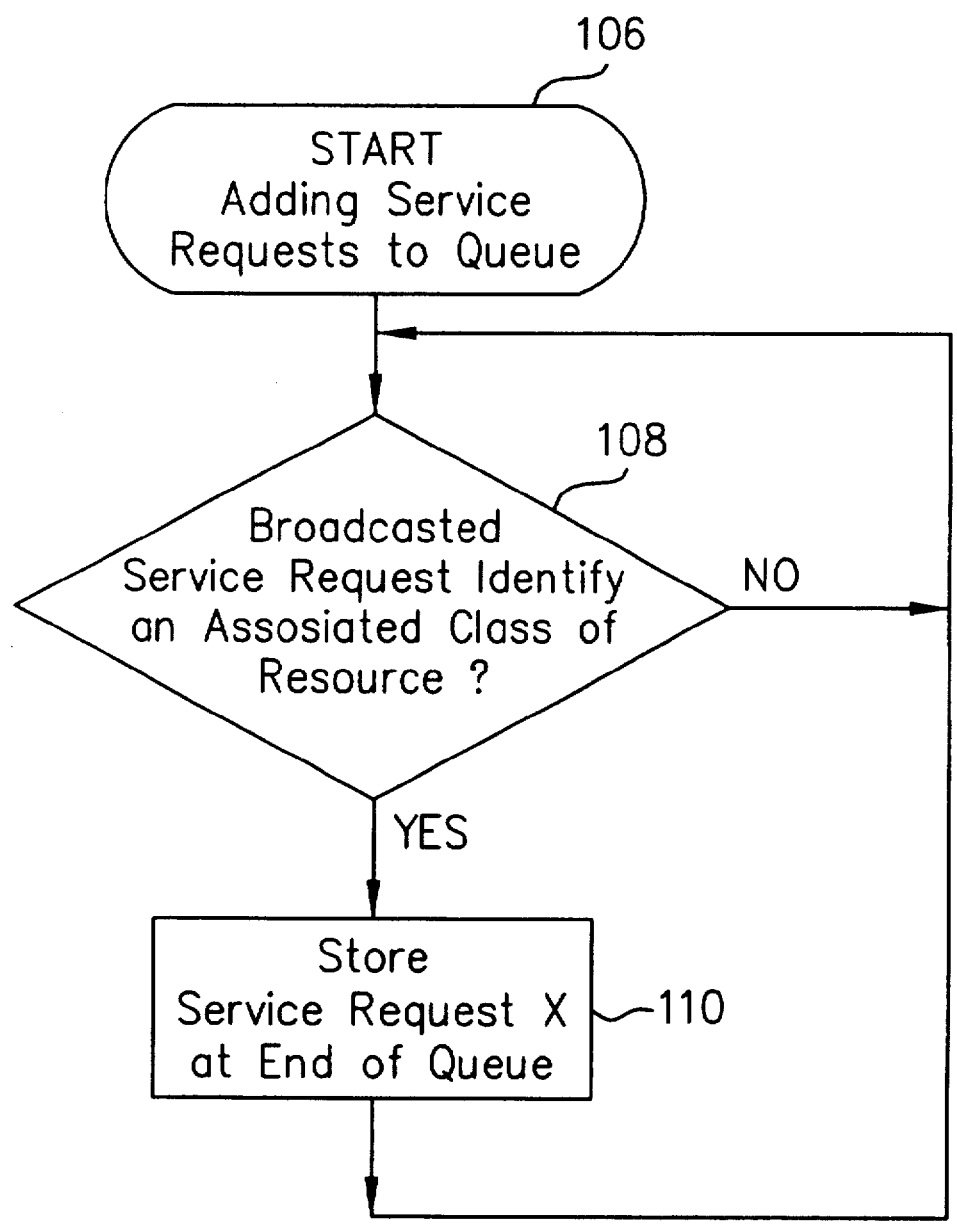
FIG. 8 is a flow chart illustrating the logic used by each node to store received service requests.

FIG. 8 illustrates the logic implemented by each of the nodes connected to the Internet 20 to store service requests broadcasted by the requesting node. The logic begins in a block 106 and proceeds to a decision block 108 where it determines if a service request has been broadcast that identifies any of the classes of resources to which the node is a member, i.e., if the node has stored in memory an object of the identified class. If so, the logic proceeds to a block 110 and the service request is stored in memory of the node at the end of the service request queue 60. The logic then returns to decision block 108 and blocks 108 and 110 are repeated for each service request that identifies a class of resource provided by the node. Since each node implements the logic illustrated in FIG. 8, it will be appreciated that each node of the same class of resource will store the request for the service provided by that resource in memory at the end of its own queue 60.

Figure 9:
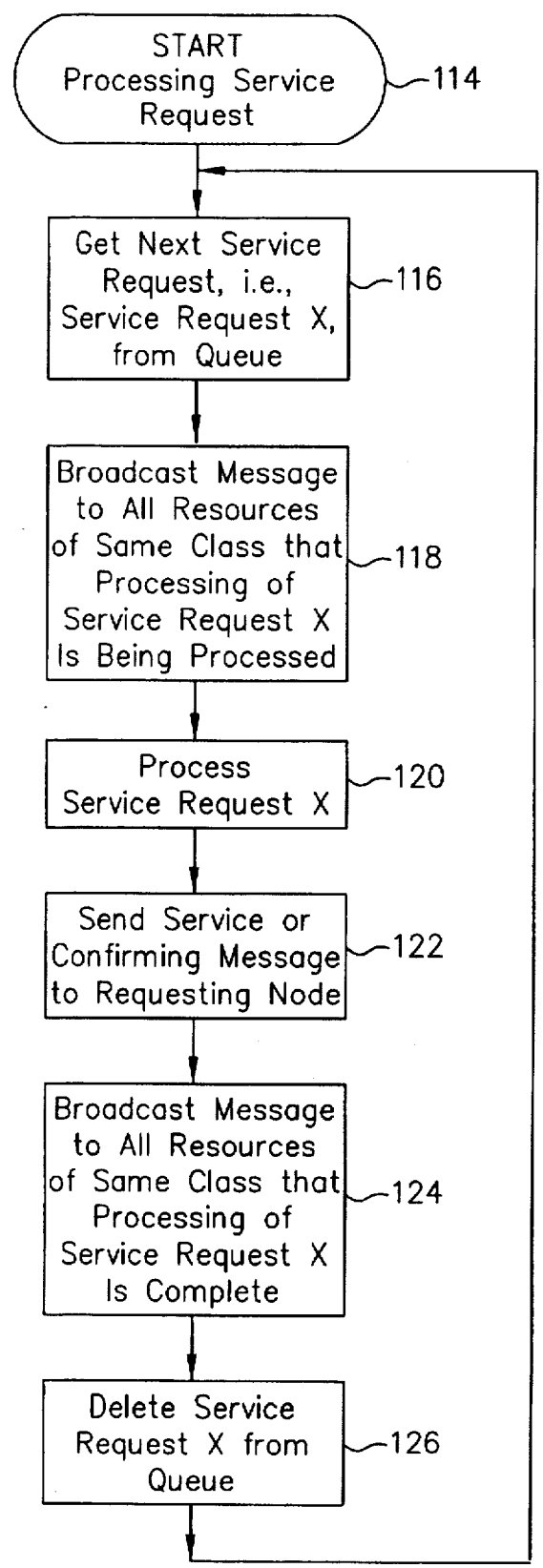
FIG. 9 is a flow chart illustrating the logic used by each node to process service requests.

FIG. 9 illustrates the logic implemented by each of the nodes to process service requests stored in memory of the node in queue 60. Essentially, each node processes each service request stored in memory in queue 60 in a first-in-first-out order and sends a message to the other nodes in the class that the service request is being processed. In this regard, the logic begins in a block 114 and proceeds to a decision block 116 where the current node gets the next service request from the queue 60. For ease of illustration and description, the next service request message will be referred to as "service request X." In a block 118, the current node broadcasts a message via the Internet 20 identifying the class of resource being provided by the node and indicating that service request X is being processed. For example, if service request X is a request for a facsimile transmission, the current node will broadcast a packet identifying the class of resource associated with the facsimile object 78. As will be discussed in more detail below, receipt of such a broadcasted message by the other nodes of the class, i.e., the nodes storing the facsimile object 78, causes those nodes to place the service request at the end of their respective service request queues, thus, deferring processing service request until confirmation of service performance is received.

Once the resource finishes processing service request X in block 120, the logic proceeds to a block 122 where either the requested service or a message confirming performance of the service is sent to the requesting node. In a block 124, the current node broadcasts a message via the Internet to all of the other nodes of the same class confirming that processing of service request X is complete and that the service has been performed. As will be discussed in more detail below, receipt of this confirmation message by the other nodes of the class causes those nodes to delete the service request X from their respective service request queues 60. Finally, in a block 126, the current node deletes the service request X from its own service request queue 60 stored in memory. The logic then returns to block 110, and blocks 110 through 126 are repeated for the next service request in the queue.

Figure 10A:
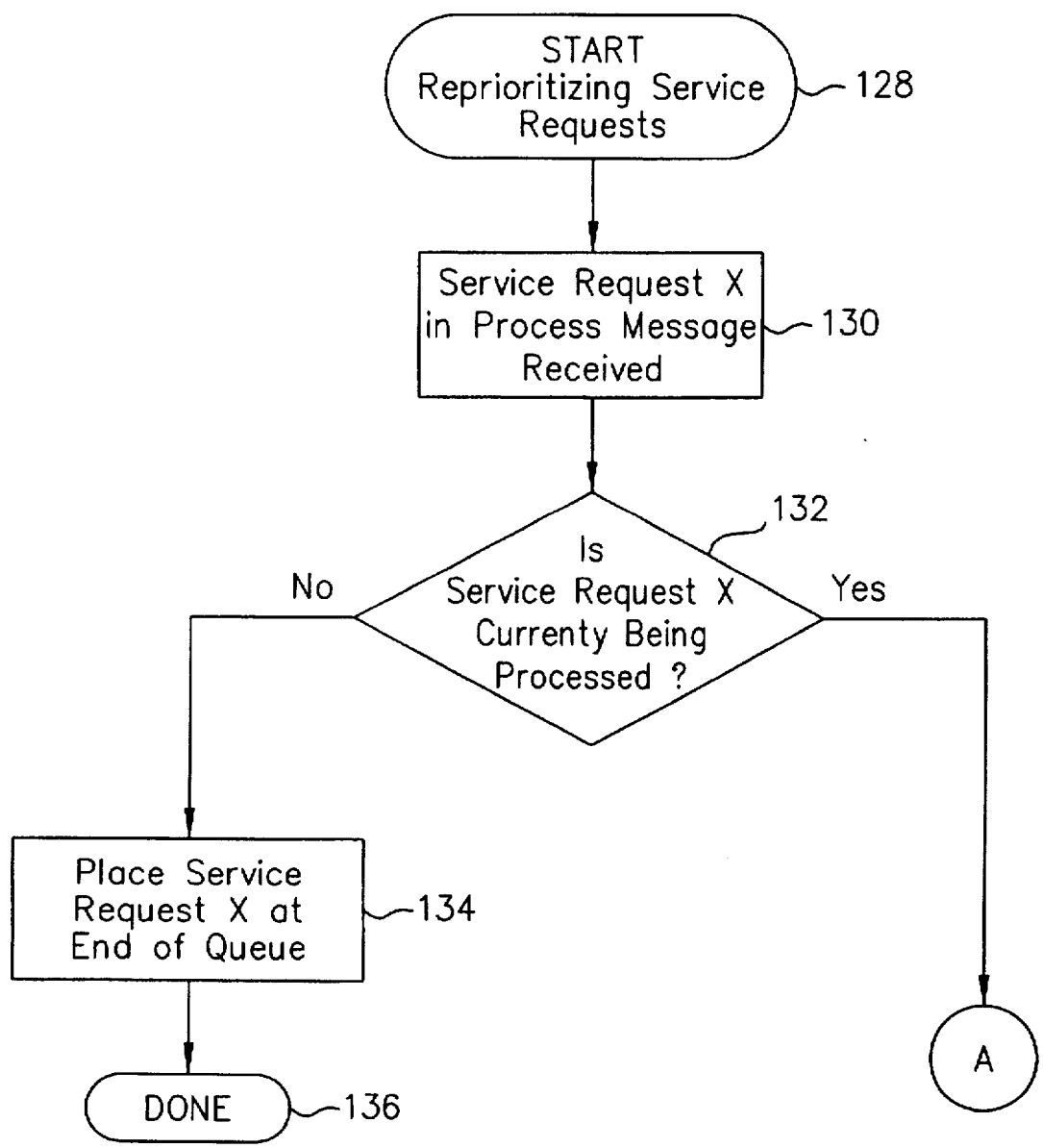
FIG. 10 is a flow chart illustrating the logic used by node to change the order in which it processes service requests.
Figure 10B:
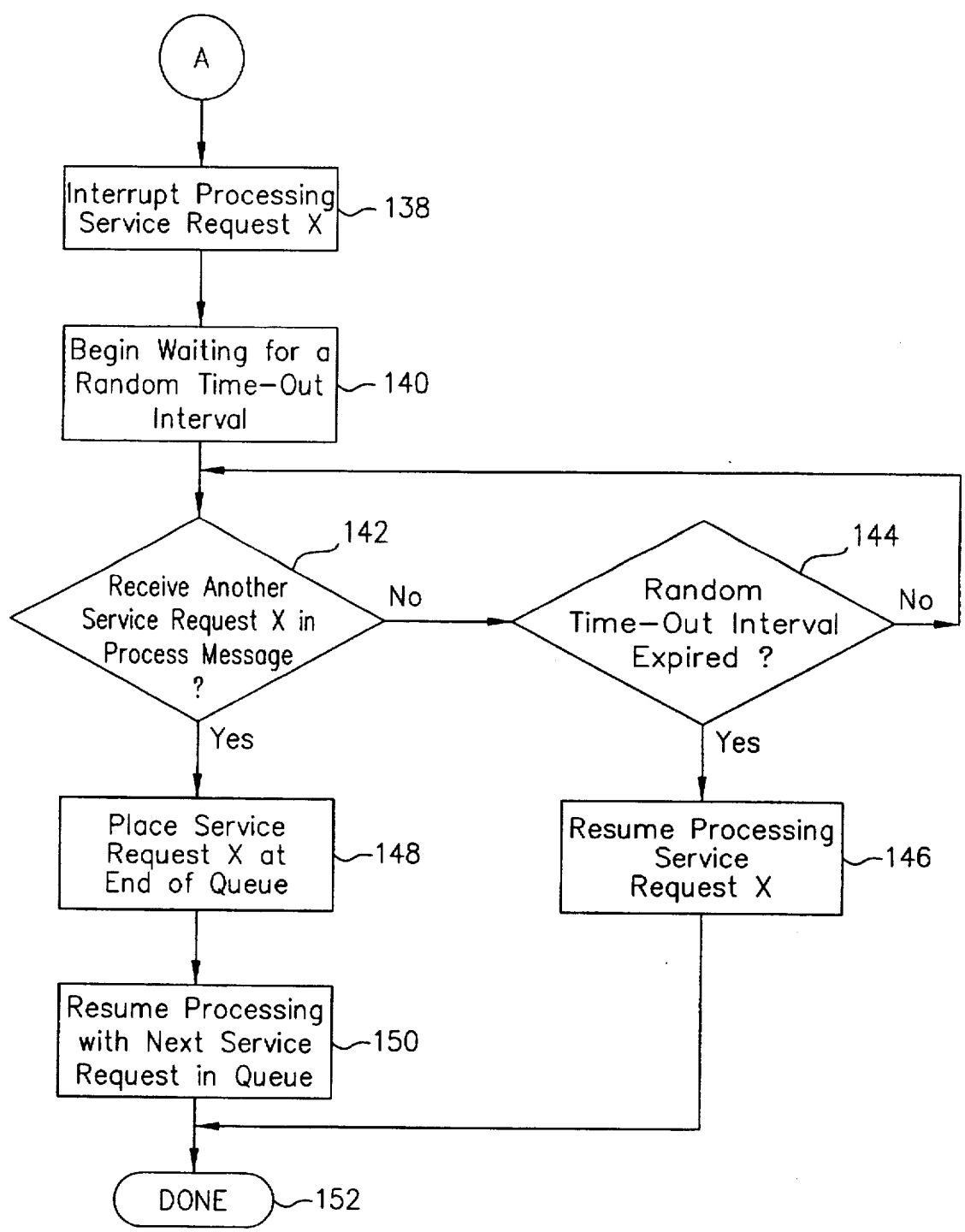

FIG. 10 depicts the logic used simultaneously by each node to reprioritize the order in which it processes service requests, i.e., to place a service request at the end of its queue 60 if another node in the same class processes the service request first. The logic begins in a block 128 and proceeds to block 130 where a message indicating that another node is processing service request X is received. It will be appreciated that this is the message broadcast in accordance with the logic illustrated in FIG. 9 by the node processing service request X. In a decision block 132, the current node determines if it is currently processing service request X itself. If so, more than one node is attempting to process the same service request at the same time. Therefore, both nodes must wait for a random amount of time such that the first resource to "time-out" is allowed to process the service request. Consequently, if the result of decision block 132 is positive, the logic proceeds to a block 138 in which processing of service request X by the current node is interrupted. In a block 140, the current node begins waiting for a random time-out interval to expire. In a decision block 142, the logic determines if the node has received another message indicating that service request X is being processed. If so, this indicates that the other node (who is simultaneously implementing the logic depicted in FIG. 10 because it has received a message from the current node that service request X is being processed) attempting to process service request X has timed-out prior to the current node, and thus, has been allowed to continue processing service request X. Consequently, in a block 148 the current node will place service request X at the end of its service request queue 60 and in block 150 the current node resumes processing with the next service request in the queue 60 by broadcasting an in process message for the next message in block 118 of FIG. 9. The logic then ends in block 152.

On the other hand, if the result of decision block 142 is negative, i.e., the current node has not received another message indicating that service request X is in process, the logic proceeds to a decision block 144 where it determines if the random time-out interval has expired. If not, decision blocks 142 and 144 are repeated until another "service request X in process" message is received or until the random time-out interval expires, whichever comes first. If the random time-out interval expires first, the current node has timed-out first and resumes processing service request X in block 146. It will be appreciated the current node will resume processing service request X at block 118 of FIG. 9 by broadcasting an in process message to the other nodes in the same class of resource. As described above, the other node attempting to process service request X will receive this message during its random time-out interval, and thus, defer processing service request X and begin processing the next service request in its queue. The logic then ends in block 152.

Returning to decision block 132 in FIG. 10, it is more likely that the current node is in the midst of processing a service request other than service request X when it receives the message that service request X is being processed by another node. Therefore, the logic proceeds from block 132 directly to block 134 so that the current node can change the order in which it processes the service requests in its queue 60, thus deferring process of service request X. In the actual embodiment of the present invention illustrated in FIG. 10, service request X is merely removed from its current location in the queue and placed at the end of the queue in block 134. The logic then ends in a block 136. Those of ordinary skill in the art will appreciate that in other embodiments a prioritization scheme more sophisticated than merely placing the service request at the end of the queue may be used. For example, the service request may be reprioritized in the queue as a function of service throughput or complexity.

Regardless of the prioritization scheme, if service request X is not ultimately performed by any other node in the class (due to malfunction, communication breaks, etc.) by the time the current node reaches service request X in its queue, the current node will eventually process service request X by default. In other words, the next node of the class to reach service request X in its queue will process it. If this node fails, then the next node to reach service request X will process the request, and so on. Those of ordinary skill in the art will appreciate that this feature of the present invention provides a high degree of fault tolerance and service throughout the system as long as there is more than one node in a class. The degree of fault tolerance and service throughout is increased by merely adding nodes to the class of resource that are capable of providing the service. As described above, this is accomplished by merely programming an object of the appropriate class in memory of the node being added to the class.

Figure 11:
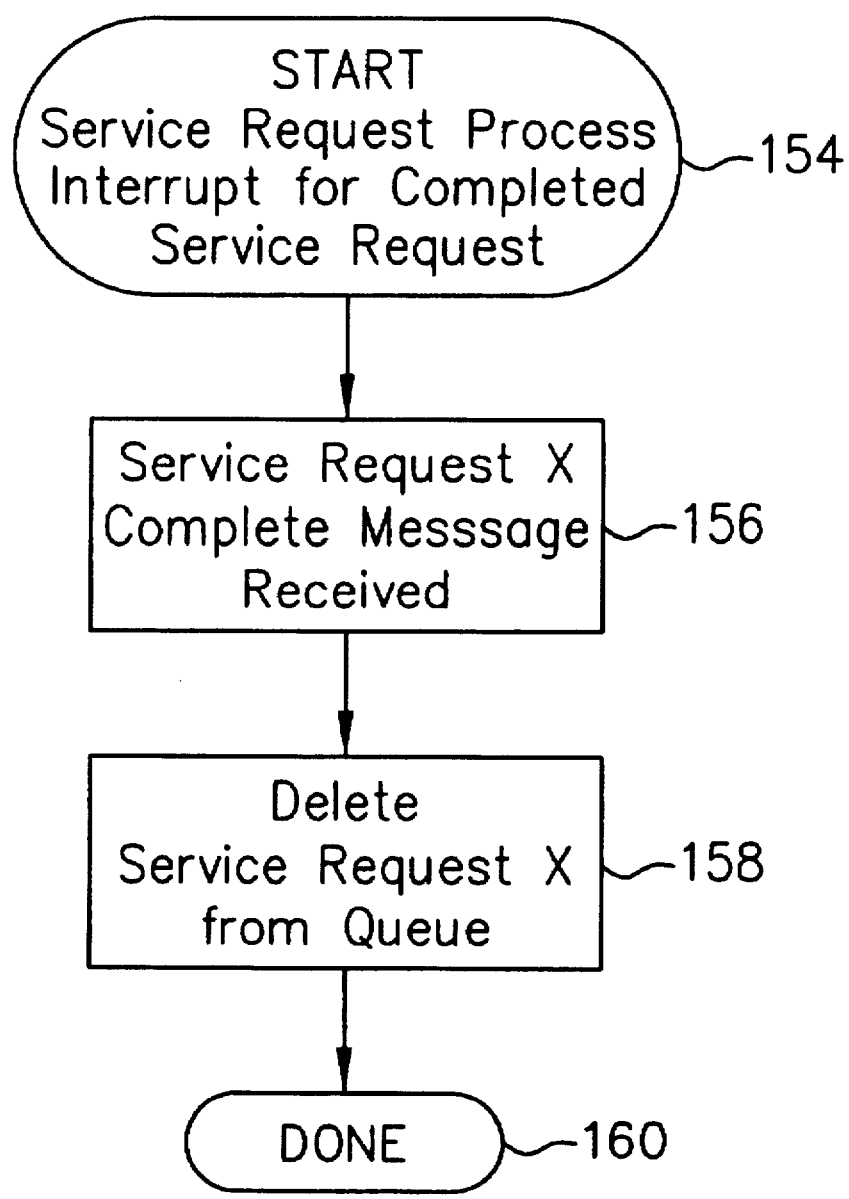
FIG. 11 is a flow chart illustrating the logic used by each node to delete service requests from its memory.

FIG. 11 illustrates the logic used simultaneously by each node to delete a particular service request from its queue when another node successfully completes the service request. The logic begins in a block 154 and proceeds to a block 156 where a message is received by the current node indicating that service request X has been completed and the service performed by another node in the same class resource. In a block 158 the node deletes the service request X from its queue 60 of service requests. The logic ends in a block 160. Since each node in the class of resource capable of providing service request X receives the message indicating that service request X has been completed, it will be recognized that each of those nodes will then delete service request X from its queue. Thus, it is insured that the requested service shall only be performed once and any redundancy is eliminated.

While the preferred embodiment of the invention has been illustrated and described, it will be appreciated that various changes can be made therein without departing from the spirit and scope of the invention. For example, the present invention may be applied to a network, e.g., a LAN, WAN or RAS, that is not commonly linked to the Internet 20. If so, the resources available will be limited to those offered by the nodes connected to the network. Further, it is not necessary that an object-oriented programming paradigm be employed to organize the nodes into classes of resources. The nodes can be identified, grouped and categorized into a class in any manner deemed suitable by a programmer.

The embodiments of the invention in which an exclusive property or privilege is claimed are defined as follows:

1. A method for requesting and processing services from a plurality of object-based nodes connected to a communication medium which operates under a Transmission Control Protocol (TCP) based, connection-oriented network protocol, the method comprising:

(a) classifying the nodes into classes of resources, each class of resource providing a type of service;

(b) requesting a service from any node in a class of resource by broadcasting a service request via the communication medium to the nodes of the class of resource providing the service;

(c) for each node of the identified class,
   assigning a priority in which the service is to be processed by the node to the service request;

(d) for a first node of the class to process the service request,
   (i) broadcasting a message to the other nodes of the class indicating that the service is being performed;
   (ii) processing the requested service; and
   (iii) sending at least one of the service and a confirming message to the node requesting the service; and (e) for each of the other nodes of the class reassigning the priority assigned to the service request in which the service is to be processed in response to the message broadcast from the first node.

2. The method of claim 1, further comprising:
if the first node fails to perform the service, for a next node of the class to process the service request according to the new assigned priority,
(a) performing the requested service; and
(b) broadcasting a message to the other nodes of the class indicating that the service is being performed and causing each of the other nodes of the class to reassign the priority in which the service is to be processed by the node to the service request.

3. The method of claim 2, further comprising,
if the service is fully performed, for the node performing the service request, broadcasting a message to the other nodes of the class indicating that the service request is complete and causing each of the other nodes of the class to delete the service request.

4. The method of claim 1, wherein the communication medium connected to the plurality of nodes is interconnected to other communication media via a plurality of common communication links, wherein the other communication media connect pluralities of other nodes, and wherein each node is classified into at least one class of resource.

5. The method of claim 4, wherein each class of resource is associated with an object in an object-oriented programming paradigm that is used to control the nodes of the class of resource, and wherein the objects are interoperable and organized in a hierarchical fashion.

6. The method of claim 5, wherein each object may be divided into lower order subclasses of objects.

7. Apparatus, included in each of the nodes of a plurality of object-based nodes communicating with one another via common communication links which operate under a Transmission Control Protocol (TCP) based connection-oriented network protocol, for processing services from the plurality of nodes in response to service requests, comprising:
   (a) a storage medium for storing program instructions for requesting and processing services;
   (b) an input/output device for communicating via the communication links; and
   (c) a processing unit electronically coupled to the storage medium and the input/output device for executing the program instructions that cause the node to:
      (i) determine if the node requires a service, and if so, causing the node to broadcast a service request to the other nodes connected to the common communication links that are capable of providing the service;
      (ii) for each service request to be processed, broadcasting a priority message to each of the other nodes connected to the common communication links that are capable of providing the service, wherein the priority message causes each of the nodes to redefine the order in which the node processes received service requests;
      (iii) process received service requests in a defined order; and
      (iv) for each service performed, broadcasting a confirmation message to each of the other nodes connected to the common communication links that are capable of providing the service, wherein the confirmation message causes each of the nodes to delete the service request from the storage medium of the node.

8. The apparatus of claim 7, wherein the plurality of nodes are organized into classes of resources, each class of resource providing a type of service.

9. The apparatus of claim 7, wherein received service requests are stored in the storage medium in a queue and processed in a first-in-first-out order.

10. The apparatus of claim 9, wherein the priority message instructs the node to place the service request at the end of the queue and resume processing the service requests in the queue in a first-in-first-out order.

11. The apparatus of claim 8, wherein each class of resource into which a node is organized is associated with an object in an object-oriented programming paradigm, wherein the object contains methods and data defining the behavior of the class of resource associated with the object, and wherein the object is stored in the memory of the node.

12. A method for requesting services from a plurality of object-based nodes interconnected by common communication links which operate under a Transmission Control Protocol (TCP) based, connection-oriented network protocol, wherein each node is capable of providing at least one resource of services to the other nodes via the common communication links, the method comprising:
   (a) organizing each node capable of providing the same at least one resource into a class of resource;
   (b) requesting a service by broadcasting a service request via the common communication links that identifies the class of resource for the service; and
   (c) for each node in the class of resource for the service,
      (i) adding the service request to a queue of service requests;
      (ii) as each service request is processed, broadcasting an process message to the other nodes in the class of resource for the service, wherein the process message indicates that the service is being processed by the node;
      (iii) processing each service request in the queue in a predefined order; and
      (iv) if the service is performed by the node, broadcasting a confirmation message to the other nodes in the class of resource for the service, wherein the confirmation message indicates that the service has been performed by the node.

13. The method of claim 12, further comprising:
for each node in the class of resource for the service receiving the process message, redefining the order in which the node processes each service request in the queue.

14. The method of claim 13, further comprising:
for each node in the class of resource for the service receiving the confirmation message, deleting the service request from the queue so that the service request is not processed by the node.

15. The method of claim 14, wherein each class of resource is associated with an object in an object-oriented programming paradigm, wherein the object contains methods and data defining the behavior of the class of resource associated with the object.

16. The method of claim 13, wherein if the node is be capable of providing a plurality of resources, the node is organized into a plurality of classes of resources.

17. A computer readable medium having an executable component for requesting services from a plurality of object-based nodes interconnected by common communication links which operate under a Transmission Control Protocol (TCP) based, connection-oriented network protocol, wherein each node is capable of providing at least one resource of services to the other nodes via the common communication links, and wherein the executable computer component requests services by:

(a) organizing each node capable of providing the same at least one resource into a class of resource;

(b) requesting a service by broadcasting a service request via the common communication links which identifies the class of resource for the service; and (c) for each node in the class of resource for the service,
  (i) adding the service request to a queue of service requests;
  (ii) as each service request is processed, broadcasting a process message to the other nodes in the class of resource for the service, wherein the process message indicates that the service is being processed by the node;
  (iii) processing each service request in the queue in a predefined order; and
  (iv) if the service is performed by the node, broadcasting a confirmation message to the other nodes in the class of resource for the service, wherein the confirmation message indicates that the service has been performed by the node.

* * * * *

UNITED STATES PATENT AND TRADEMARK OFFICE
CERTIFICATE OF CORRECTION

PATENT NO. : 5,949,977                                    Page 1 of 2
DATED      : September 7, 1999
INVENTOR(S): E.N. Hernandez It is certified that error appears in the above-identified patent and that said Letters Patent is hereby corrected as shown below:

| COLUMN | LINE | ERROR |
|---|---|---|
| [56] Pg. 1, col. 1 | Refs. Cited (Other Publs., Item 3) | "Priniciples" should read --Principles-- |
| [56] Pg. 1, col. 2 | Refs. Cited (Other Publs., Item 5) | "1959." should read --1995.-- |
| [56] Pg. 1, col. 2 | Refs. Cited (Other Publs., Item 8) | "Prentic-Hall" should read --Prentice-Hall-- |
| 11 (Claim 1, | 7-8 lines 12-13) | after "class," delete the paragraph return |
| 11 (Claim 1, | 17 line 22) | after "class" insert --,-- |
| 12 (Claim 12, | 49 line 17) | "an process" should read --a process-- |

UNITED STATES PATENT AND TRADEMARK OFFICE
CERTIFICATE OF CORRECTION

PATENT NO. : 5,949,977
DATED : September 7, 1999
INVENTOR(S) : E.N. Hernandez

It is certified that error appears in the above-identified patent and that said Letters Patent is hereby corrected as shown below:

| COLUMN | LINE | ERROR |
|---|---|---|
| 13 (Claim 16, | 8 line 1) | after "node is" delete "be" |

Signed and Sealed this

Twenty-second Day of August, 2000

Attest:

Q. TODD DICKINSON

*Attesting Officer*   *Director of Patents and Trademarks*